United States Patent
Braun et al.

(10) Patent No.: US 9,958,022 B2
(45) Date of Patent: May 1, 2018

(54) ENERGY DISSIPATING DEVICE

(71) Applicant: MAURER SÖHNE ENGINEERING GMBH & CO. KG, München (DE)

(72) Inventors: Christian Braun, Holzkirchen (DE); Renzo Medeot, Selvazzano (IT)

(73) Assignee: MAURER SÖHNE ENGINEERING GMBH & CO. KG, München (DE)

( * ) Notice: Subject to any disclaimer, the term of this patent is extended or adjusted under 35 U.S.C. 154(b) by 0 days. days.

(21) Appl. No.: 15/124,628

(22) PCT Filed: Mar. 17, 2015

(86) PCT No.: PCT/EP2015/055591
§ 371 (c)(1),
(2) Date: Sep. 8, 2016

(87) PCT Pub. No.: WO2015/140188
PCT Pub. Date: Sep. 24, 2015

(65) Prior Publication Data
US 2017/0016504 A1   Jan. 19, 2017

(30) Foreign Application Priority Data

Mar. 18, 2014   (EP) .................................... 14160454

(51) Int. Cl.
*E04B 1/98* (2006.01)
*F16F 7/12* (2006.01)
*E04H 9/02* (2006.01)

(52) U.S. Cl.
CPC .............. *F16F 7/128* (2013.01); *E04H 9/02* (2013.01); *E04B 1/98* (2013.01); *E04H 9/028* (2013.01)

(58) Field of Classification Search
CPC ... E04H 9/02; E04H 9/028; E04B 1/18; E04B 1/24; E04B 1/98; E04B 1/985; E04C 3/02
USPC ...... 52/167.1–167.3; 248/562; 188/129, 381; 267/134, 196, 200, 294
See application file for complete search history.

(56) References Cited

U.S. PATENT DOCUMENTS

| 3,164,222 A * | 1/1965 | Conrad | F16F 7/08 188/129 |
| 4,281,487 A * | 8/1981 | Koller | E04H 9/021 248/351 |
| 5,183,137 A * | 2/1993 | Siwek | F16F 7/09 188/129 |
| 5,915,503 A * | 6/1999 | Enright | F16D 55/36 188/130 |
| 5,946,866 A * | 9/1999 | Weglewski | E04H 9/022 52/167.1 |
| 6,141,919 A * | 11/2000 | Robinson | F16F 1/40 248/562 |

(Continued)

FOREIGN PATENT DOCUMENTS

| WO | 2008/115480 A1 | 9/2008 |
| WO | 2010/119154 A1 | 10/2010 |

*Primary Examiner* — Christopher P Schwartz
(74) *Attorney, Agent, or Firm* — Baker & Hostetler LLP

(57) ABSTRACT

An energy dissipating device which is capable of dissipating energy through its plastic axial deformation without undergoing buckling comprises at least three hysteretic elements, being interconnected in series in such a way, that at least one hysteretic element will be subjected to compression while at least another hysteretic element is subjected to tension when an external load is applied to the energy dissipating device.

12 Claims, 11 Drawing Sheets

(56) References Cited

U.S. PATENT DOCUMENTS

| | | | | |
|---|---|---|---|---|
| 7,185,462 | B1* | 3/2007 | Smelser | E04H 9/02 |
| | | | | 52/167.1 |
| 8,516,753 | B2* | 8/2013 | Christopoulos | E04H 9/022 |
| | | | | 52/167.3 |
| 2002/0095879 | A1* | 7/2002 | Fanucci | E04H 9/02 |
| | | | | 52/167.3 |
| 2005/0077664 | A1* | 4/2005 | Mochimaru | F16F 9/103 |
| | | | | 267/196 |
| 2006/0101733 | A1* | 5/2006 | Jen | E04H 9/02 |
| | | | | 52/167.1 |
| 2009/0212474 | A1* | 8/2009 | Reeves | A62B 35/04 |
| | | | | 267/70 |
| 2011/0041425 | A1* | 2/2011 | Bystricky | E04H 9/021 |
| | | | | 52/167.3 |
| 2012/0204509 | A1* | 8/2012 | Lim | E04H 9/021 |
| | | | | 52/393 |
| 2012/0266548 | A1* | 10/2012 | Tremblay | E04H 9/02 |
| | | | | 52/167.3 |

* cited by examiner

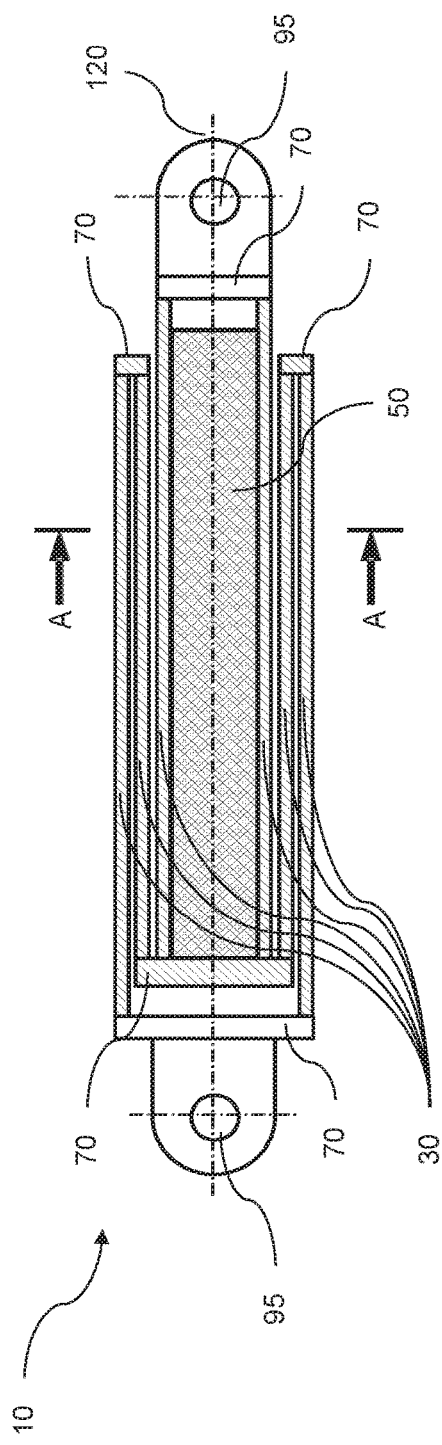
Fig. 7
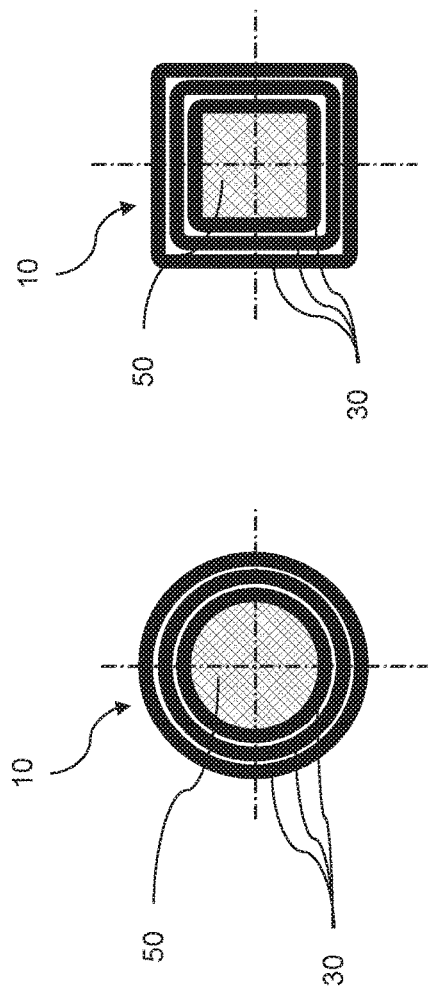
Fig. 8a
Fig. 8b

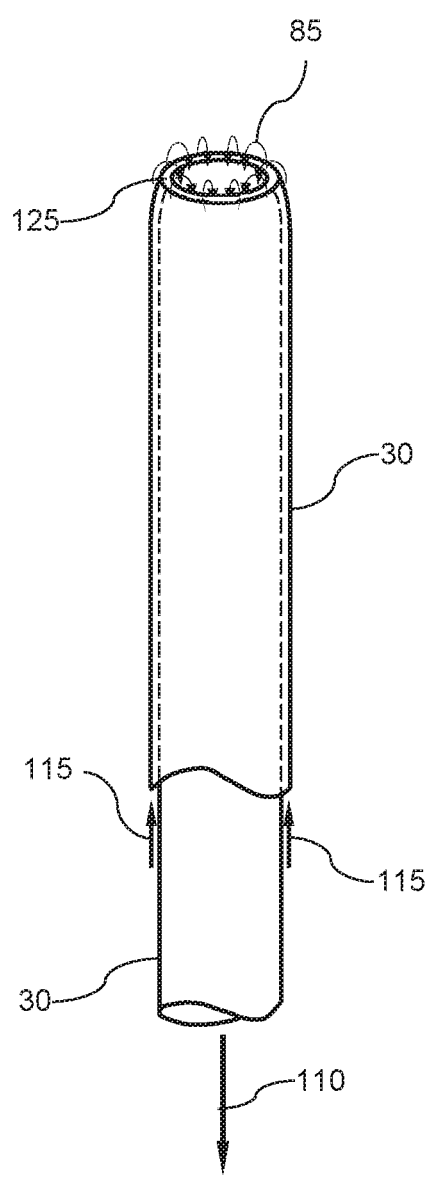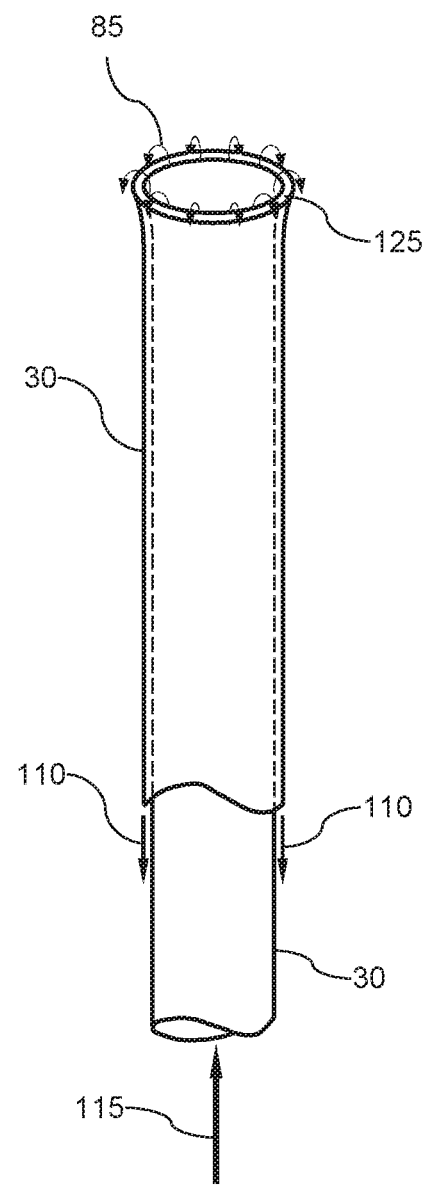
Fig. 9a                           Fig. 9b

ENERGY DISSIPATING DEVICE

CROSS-REFERENCE TO RELATED APPLICATIONS

This application is a National Stage of International patent application PCT/EP2015/055591, filed on Mar. 17, 2015, which claims priority to foreign European patent application No. EP 14160454.6, filed on Mar. 18, 2014, the disclosures of which are incorporated by reference in their entirety.

FIELD OF THE INVENTION

This invention relates to an energy dissipating device which has at least one hysteretic element (HE) so that it is capable of dissipating energy through its plastic axial deformation without undergoing buckling.

BACKGROUND

Energy dissipating devices are used to connect adjacent structural elements or systems of structures like a bridge deck and its abutment or a building and its foundation with the aim of mitigating the adverse effects of dynamic actions like those deriving from earthquakes but also from windstorms, impacts, etc.

As it is known, the reason for adopting these devices stems from the fact that seismic actions produce sudden onset soil displacements with associated accelerations that, transmitted through the foundation, generate inertial forces due to the comparatively large mass of structures such as bridges, buildings and the like.

Alternatively we may say that during a seismic event large amounts of energy are generated and propagated through the soil. Said energy can be transmitted to a structure, and the same represents the main cause of possible damage secondary to a seismic event.

Furthermore, it is also known that by using suitably located isolating devices, referred to as "seismic isolators", it is possible to limit the amounts of energy transmitted to the structure and thus also the loads thereby generated. In other words, seismic energy is reflected by the aforesaid isolation devices, except for that portion associated with a frequency equal to or near the resonance frequency.

However, the structure (considered as an oscillating system) will nonetheless tend to accumulate the portion of energy within said spectrum range, making it thus necessary to use a device that dissipates the energy in the form of heat.

There are several physical mechanisms that can be used to dissipate energy. The subject case exploits the dissipating capacity of materials, when they are stressed beyond their yield point.

As it is well known, by subjecting for example a metal element like a strut made of steel to an increasing strain, a first phase of direct force-deformation proportionality is observed (elastic phase), followed by a phase of little dependence of the former on the latter (plastic or post-elastic phase). Devices using this principle are referred to as hysteretic elements (HE). Thus, the term "hysteretic" is referred to elements or devices, whose reaction largely depends on the impressed displacement (or deformation) in contrast to "viscous" elements or devices, whose reaction largely depends on the rate (velocity) of the displacement (or deformation).

The idea of utilizing steel struts as hysteretic elements within a structure to absorb large portions of seismic energy began with the conceptual and experimental work of Skinner—New Zealand (1975). Today this kind of device is known as steel hysteretic damper (SHD). Actually, plastic deformation of steel is one of the most effective mechanisms available for the dissipation of energy, from both economic and technical point of view. Steel dissipaters for steel hysteretic dampers have been conceived and manufactured in a very large geometric configuration variety. Nonetheless, their most serious drawback is the limited capacity of accommodating large displacements, as necessary in zones prone to moderate or high seismicity.

This is the main reason why hydraulic viscous dampers (HVDs) gained a progressively increasing popularity in bridge structures as elements capable of mitigating local vibrations, limiting structural drift as well as source of supplemental damping, virtually without any limitation displacement-wise.

In recent years, however, some concerns were raised in the United States by the conditions of devices in service on Caltrans bridges, suspected of leaking hydraulic fluid, after a time in service of approximately 10 years. Even though this event should not be interpreted as a proof of a systemic deficiency of this type of devices (in Europe such hitches are rarely been observed), nonetheless some tests and inspections, recently completed at University of California at San Diego, indicated an unexpected level of degradation in dampers not subjected to any large seismic event.

In response to this concern and as an alternative solution to the use of HVDs, a few research projects have been carried out at the University of Utah and the Department of Structural Engineering of University of California at San Diego to investigate the applicability and limitations of hysteretic elements (HEs) for long-span bridge applications.

Steel brace frames are widely used for building construction. For seismic applications, however, diagonal braces are expected to yield in tension, but buckle in compression. To avoid this undesirable phenomenon and thus provide a more reliable source of energy dissipation, the concept of buckling restrained braces (BRB) as hysteretic elements was first developed in Japan in the early 1970s.

Extensive research was since conducted in Japan and a variety of BRBs have been developed by Nippon Steel Corp. But it was not until after the Kobe Earthquake in 1995 that Japanese designers started to incorporate BRBs in the so-called "damage-tolerant" seismic design of multistory buildings. Actually, BRBs have also been used in two long-span bridges in Japan after the above mentioned disastrous event, one for a case of seismic retrofit and one for a new construction.

The main idea behind BRB is to avoid global buckling such that a full and stable hysteresis loop can be developed to dissipate energy. A variety of BRBs have been developed, but the concept is very simple. FIG. 11 illustrates this concept.

A long and relatively slender bar or strut functions as hysteretic element that acts as a yielding steel core, usually made of low strength steel with high ductility. It is encased in a steel tube with mortar infill functioning as a buckling preventer for the hysteretic element. However, as opposed to what occurs in reinforced concrete members, some unbonding materials or even an air gap is provided to isolate the yielding steel core and the surrounding buckling restraining mechanism to discourage composite action.

The foremost BRBs' drawback resides in their excessive length, which derives from the relatively limited permissible yield deformation under repeated cycling, as requested in seismic applications. This shortcoming severely limits the applicability of this type of devices to those cases where large spaces are available for their installation.

Therefore, it is an object of the invention to provide a simple and cheap energy dissipating device which has broad application possibilities even where space is limited.

The solution of this object is achieved by an energy dissipating device according to claim 1. Preferred further configurations of the energy dissipating device are described in the dependent claims.

It is characteristic for an energy dissipating device according to the invention, that the energy dissipating device comprises at least three hysteretic elements, being interconnected in series in such a way, that at least one hysteretic element will be subjected to compression while at least another hysteretic element is subjected to tension under an external load (e.g. seismic, wind and/or impact load) being applied to the energy dissipating device, as it will become clear in the following.

This has the beneficial effect that the axial overall dimension of the device is markedly reduced. Or, conversely, larger relative displacements can be accommodated in a device having equal length compared with those known from the past. By reducing the overall length of the device, it can be much more easily installed in existing or newly designed structures.

Moreover, the tensioned hysteretic element(s) may stabilize the compressed hysteretic element(s) against buckling, so that a buckling preventer may not be needed, at least under certain circumstances.

Furthermore, the energy dissipating device is preferably designed in such a way that it can undergo several hysteretic cycles before it needs to be replaced.

In another configuration of the energy dissipating device the hysteretic elements are arranged in parallel to each other. A parallel arrangement of the hysteretic elements has the advantage that said device has a compact overall length compared to existing Buckling Restrained Braces. Even though a parallel arrangement is preferred, here also such hysteretic elements are to be considered, which are arranged to form an angle between each other.

If a more compact device is desired, the hysteretic elements are preferably arranged alongside to each other. Since the at least three hysteretic elements are interconnected in series, the overall length of the energy dissipating device is about one third, compared to the overall length of an existing Buckling Restrained Brace with the same capacity to accommodate displacements. Another advantage is that a reduction of the overall length to one third leads to a buckling load that is at least increased by a factor of nine (9) according to Euler's theory. This is a further reason why a buckling preventer may not be needed in this type of device. Consequently, it is also possible to increase the capacity to accommodate displacements by a factor of about three (3) compared to existing Buckling Restrained Braces with an equal overall length.

Alternatively, at least one hysteretic element is arranged concentrically with another hysteretic element. The concentric arrangement of a hysteretic element does not necessarily require that the center axes of the hysteretic elements coincide in a line. Although this is preferred, also such energy dissipating devices shall be included in which the center axes of the hysteretic elements do not coincide. By this arrangement it is also possible to reduce the length of the energy dissipating device. This has the aforementioned advantages of a reduced overall length compared with a conventional Buckling Restrained Brace having the same capacity to accommodate displacements.

Preferably, the energy dissipating device may have at least one hysteretic element that is made of a metal like mild steel or an alloy. Since the amount of energy which can be dissipated by the device as well as the ability to accommodate displacements depends on the hysteretic element's material, here especially materials with a high ductility, which preferably also show similar deformation characteristics under compression and tension, are preferred. By a suitable choice of the hysteretic element's material, as well as by the choice of the hysteretic element's dimensions, design parameters such as the yield point, the capability of accommodating displacements and the capability of dissipating energy by the hysteretic elements can be influenced.

It is practical that concentrically arranged hysteretic elements are formed of tubes. The tubes may have a cross section area which has a circular, square, rectangular or any other closed or opened shape. However, tubes with a closed and symmetrical cross sectional shape are preferred.

Symmetrical tubes do increase the resistance against buckling since lateral or radial deformations under axially applied loads are minimized. One significant benefit accrued from the use of tubes is the elimination of the undesirable effects of the bending moment $M=F*e$ that develops during the application of an axial force "F" when using for example flat steel bars as hysteretic elements with an eccentricity "e".

Obviously, to be concentrically arranged the inner tubes have a smaller diameter than the outer tube. The cross sectional area should be the same for all concentric tube-like hysteretic elements and is determined by the design reaction force of the device and the yield strength of the material used. This means, apart from some minor corrections due to the shape factor, the thickness of the tube's wall is inversely proportional to its diameter. As a result the concentrically arranged tubes have a similar deformation behavior.

Moreover the median part of one or more tubes may be cut longitudinally, in other words, along a generatrix. This helps to remedy the drawbacks of radial deformations of the tubes induced by axially applied loads. It is known that axially applied loads in tube-like elements produce tangential stresses in the same, which cause reduction or increase in their diameter in tension or compression respectively. Consequently, two adjacent tubes may get in touch and produce uncontrollable frictional forces, which negatively influence the reaction of the device. This effect is particularly important for configurations where the tube is arranged in the middle of adjacent concentrically arranged tubes. The local instability of the lips resulting from the cutting is minimized by the containment effect of the surrounding outer and inner tubes.

Further, the energy dissipating device may comprise a buckling preventer. A buckling preventer may be any contrivance that helps to avoid buckling of a hysteretic element. Although it is preferred to avoid the use of a buckling preventer, it might be necessary to provide an energy dissipating device with a buckling preventer to reduce the risk of buckling particularly in specific situations.

The innermost of at least one hysteretic element may be filled with a stabilizing material as buckling preventer.

As stabilizing material every high compression resistant material is suitable, for instance a mortar infill. The stabilizing material is an effective and economic method to avoid lateral deformations of said hysteretic element and in consequence to increase the resistance against buckling of the whole device.

In a further configuration of the invention's energy dissipating device the buckling preventer comprises a containment tube surrounding at least one hysteretic element wherein the space between the hysteretic element and the containment tube may be filled with a stabilizing material at least partially. By the use of a containment tube a lateral deformation of the at least one hysteretic element under an axially applied load is avoided. By filling a stabilizing material in the space between the hysteretic element and the containment tube the possibility of a lateral deformation of the at least one hysteretic element under an axially applied load is even more reduced since there is no space left for such a deformation.

Further the buckling preventer may also comprise a containment tube which surrounds several hysteretic elements at once. Then the space between the hysteretic elements and/or the containment tube and/or the space between the hysteretic elements themselves is preferably filled with a stabilizing material.

The containment tube may be manufactured from a single piece of tube. Alternatively, the buckling preventer may also be composed of an outer containment tube and an inner containment tube. In this case the space between the outer and inner containment tube is preferably filled with a stabilizing material as additional buckling restraining mechanism. The use of an inner and outer containment tube, especially if the space in-between is filled with a stabilizing material, is a simple but effective way of increasing the buckling resistance of the energy dissipating device.

Especially in the case where the hysteretic elements are symmetrically located with respect to the longitudinal axis of the device, the buckling preventer may comprise at least one transverse restraint interconnecting at least two hysteretic elements. Such restraints prevent the lateral deformation of the at least two hysteretic elements, thus the buckling resistance of the device is increased. Moreover, by using more transverse restraints connecting outer ends as well as the intermediate parts of both hysteretic elements, it is possible to further increase the buckling resistance of the whole device. In this way an external containment tube used as buckling preventer may be avoided. This leads to a simpler construction of the energy dissipating device.

In a further configuration, the at least one hysteretic element may comprise on at least one of its surfaces a lubricant and/or an un-bonding material and/or a sliding pad in order to reduce frictional forces developed during a relative movement between the at least one hysteretic element and the stabilizing material and/or the containment tube and/or another hysteretic element under an external load. This is based on findings that it is advantageous if the hysteretic elements themselves have no forced contact with the stabilizing material so that they are able to move in direction of the axially applied load without excessive frictional forces.

Especially in the case, when the hysteretic elements are tube-like elements, the energy dissipating device may comprise a rigid joint which connects at least two hysteretic elements in series, being formed by at least a steel crown and/or steel plate interconnecting the two hysteretic elements. The advantage of the rigid joint is that with its stiffness it is able to resist radially applied forces. Consequently the steel crown and/or steel plate interconnecting the two hysteretic elements reduce radial deformations (changes in diameter) of the hysteretic elements. Thus a contact as well as frictional forces between the tube-like elements are avoided.

Further, the energy dissipating device may comprise a shock-transmitter that accommodates slow velocity movements and transmits almost unaltered sudden onset movements. A shock-transmitter allows slow movements without appreciable resistance, but prevents those of sudden onset without appreciable deformations. Thus, this arrangement enables to accommodate the displacements between the interconnected structural elements due to thermal variations and to transmit to the hysteretic elements the displacements due to an earthquake (but also braking forces, wind etc.) so that a significant portion of the energy associated to them can be dissipated.

BRIEF DESCRIPTION OF THE DRAWINGS

In the following the invention will be explained in more detail with reference to the embodiments shown in the drawings. These show schematically:

FIG. 1d: lateral deformations produced by the internally developed bending moments within the device of FIG. 1a;

FIG. 7: a longitudinal-sectional view of a fifth embodiment of an energy dissipating device according to the invention having tubes as hysteretic elements;

FIG. 8a: the enlarged cross-section of the energy dissipating device shown in FIG. 7 taken along the section line A-A, wherein the tubes have a circular shape;

FIG. 8b: an enlarged alternative cross-section of an energy dissipating device as shown in FIG. 7 taken along the section line A-A, wherein the tubes have a square shape;

FIG. 9a: an eight embodiment of the invention wherein radial deformation at the ends of tubes due to radially applied bending moments are produced by axially applied compression or tension load (radial deformations not to scale);

FIG. 9b: the eight embodiment of the invention wherein radial deformation at the ends of tubes due to radially applied bending moments are produced by axially applied tension load (radial deformations not to scale);

Within FIG. 1a to FIG. 10 equal reference signs are used for equal components.

DETAILED DESCRIPTION

Figure 1A:
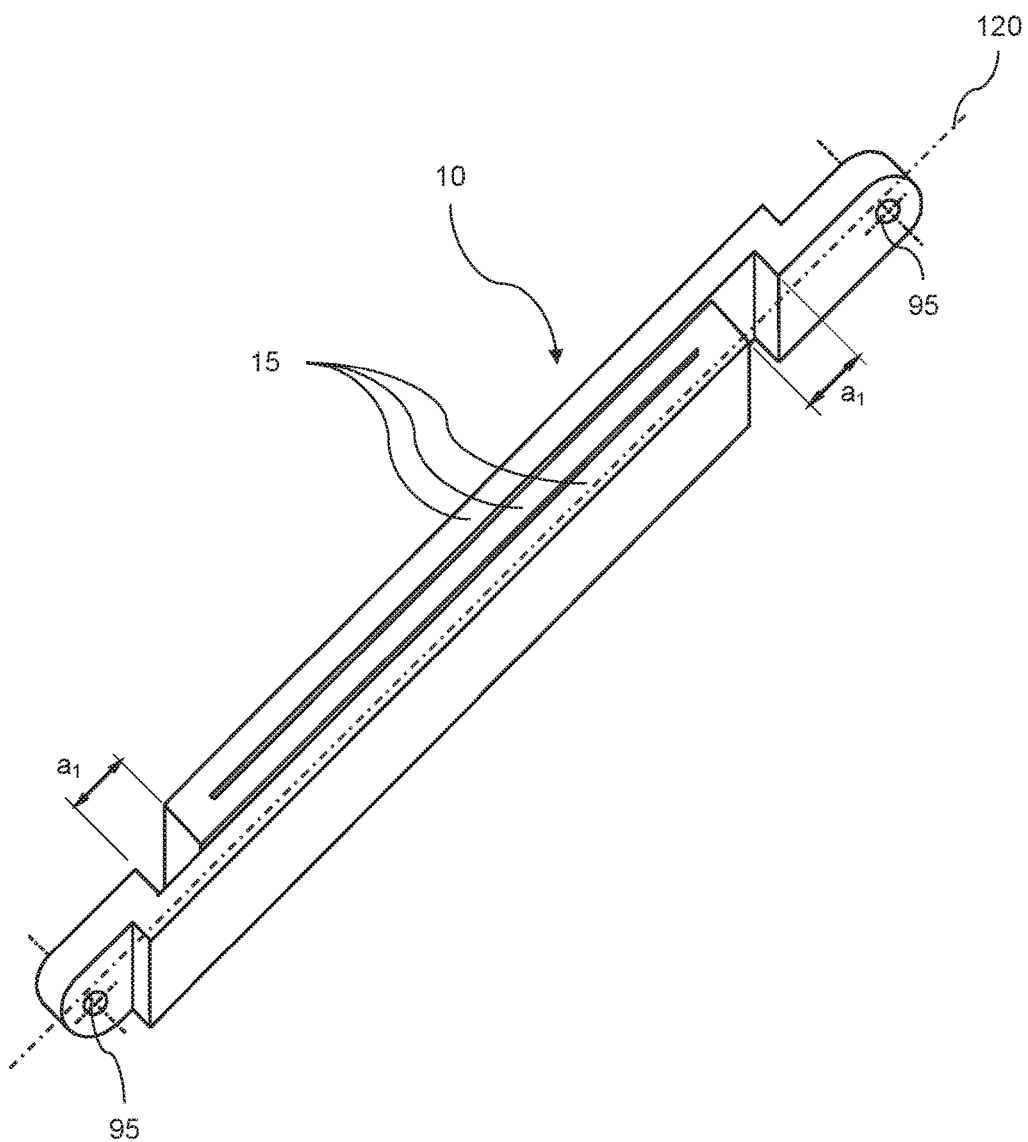
FIG. 1a: axonometric view of a first embodiment of the invention being a compact energy dissipating device in its simplest configuration in non-deformed condition.

FIG. 1a shows a first embodiment of the energy dissipating device 10 according to the invention having three hysteretic elements 15 which are interconnected in series and arranged in parallel and alongside to each other. By such an arrangement, the total length of the energy dissipating device can be reduced compared to an arrangement where only one hysteretic element is used as known in the prior art and shown for example in FIG. 11. Since all three hysteretic elements 15 are interconnected in series, each deformation of the three hysteretic elements 15 contributes to the total deformation capacity of the energy dissipating device 10. On both ends the energy dissipating device 10 comprises an end connection 95 which is used to link said device 10 adjacent to structural components like a bridge, deck, an abutment, etc. Furthermore, the backstop distance "$a_1$" gives an indication on the allowable deformation under a certain load. These deformations as well as the principles of the invention are hereinafter described in FIG. 1b and FIG. 1c.

Figure 1B:
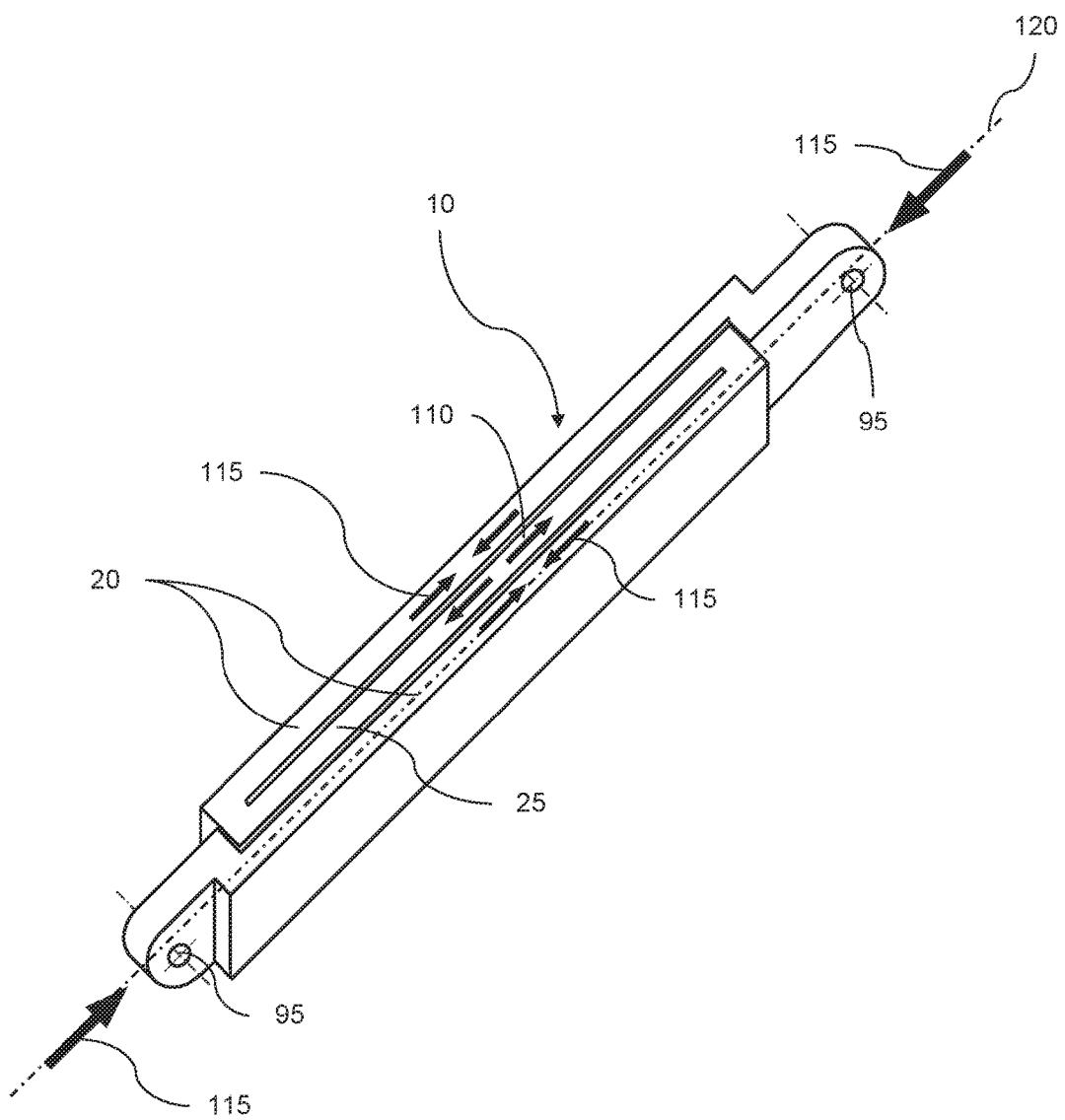
FIG. 1b: axonometric view of the energy dissipating device shown in FIG. 1a while being subjected to an axial compression force.

FIG. 1b shows the energy dissipating device of FIG. 1a being exposed to an axial compression 115. In such an arrangement, two hysteretic elements 20 are subjected to compression, whereas one hysteretic element 25 is subjected to tension. Both, hysteretic elements 20 which are subjected to compression and the hysteretic element which is subjected to tension 25 are plastically deformed. The hysteretic element subjected to compression 20 is thereby shortened by yielding of the material, whereas the hysteretic element subjected to tension 25 is stretched by yielding of its material. It can be recognized, that the backstop distance "$a_1$", shown in FIG. 1a, disappeared since the compression 115 which is applied along the longitudinal axis 120 of the energy dissipating device results in a reduction of the total length of the device 10.

Figure 1C:
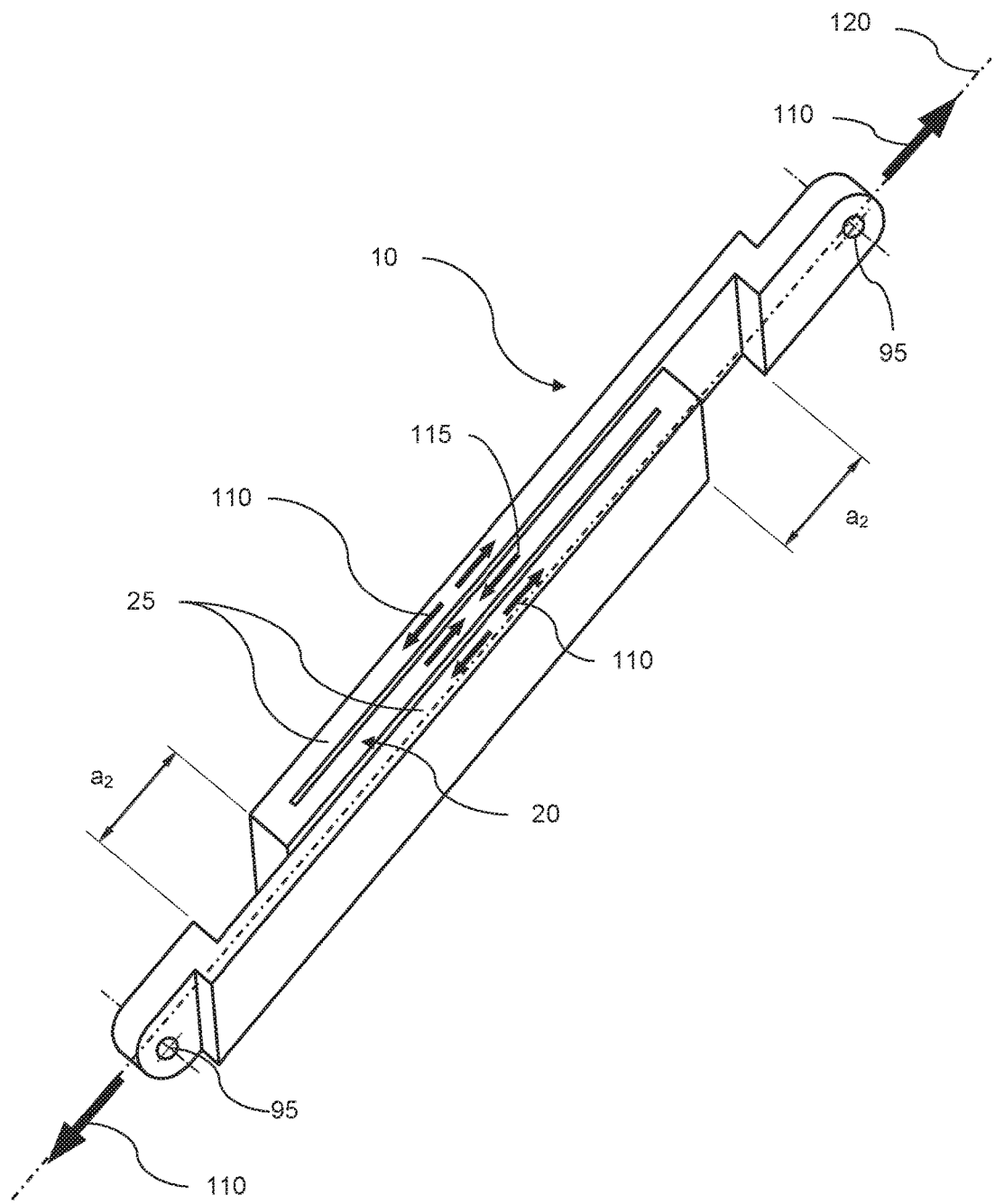
FIG. 1c: axonometric view of the device shown in FIG. 1a while being subjected to an axial tension force.

In FIG. 1c, the energy dissipating device 10 is subjected to external tension 110 along the longitudinal axis 120. Due to this external tension 110 two hysteretic elements 25 are subjected to tension whereas one hysteretic element 20 is subjected to compression 115. Both tension 110 and compression 115 within the hysteretic elements lead to a plastic deformation of said hysteretic elements. This deformation becomes visible since the backstop distance "$a_2$" has increased compared to the backstop distance "$a_1$" shown in FIG. 1a.

Figure 1D:
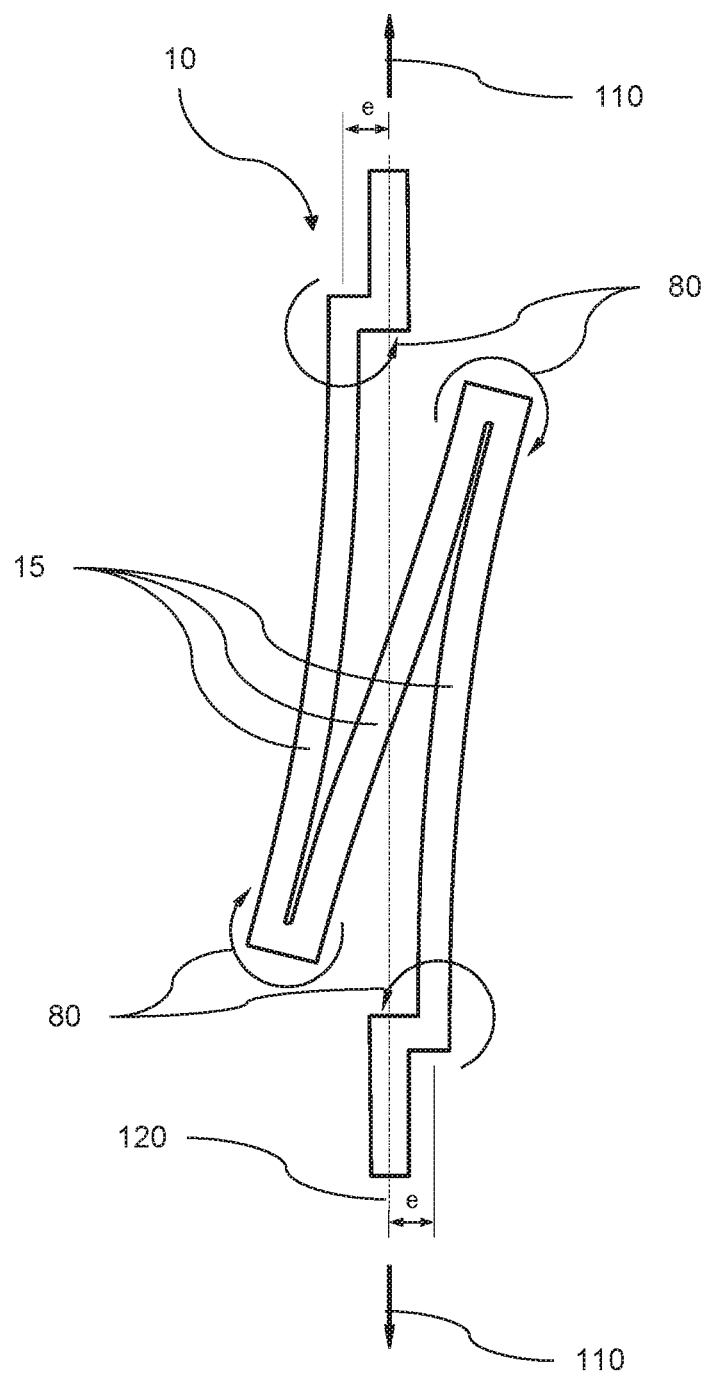

FIG. 1d is an illustration of the energy dissipating device of the first embodiment being subjected to a very large tension force 110. Since the hysteretic elements 15 are in the unloaded and un-deformed condition arranged in parallel alongside each other and are interconnected with a rigid joint, there is an eccentricity between the subjected load 110 and the hysteretic elements 15. This eccentricity produces a bending moment within the hysteretic elements equal to M=F*e, wherein "M" is the bending moment, "F" is the applied force and "e" is the eccentricity. As shown in FIG. 1d, the bending moment causes a lateral deformation of the hysteretic elements under tension 110. Although FIG. 1d only shows a dissipating device 10 which is subjected to tension 110, the formula for calculating the bending moment 80 is also valid for compression.

Figure 2:
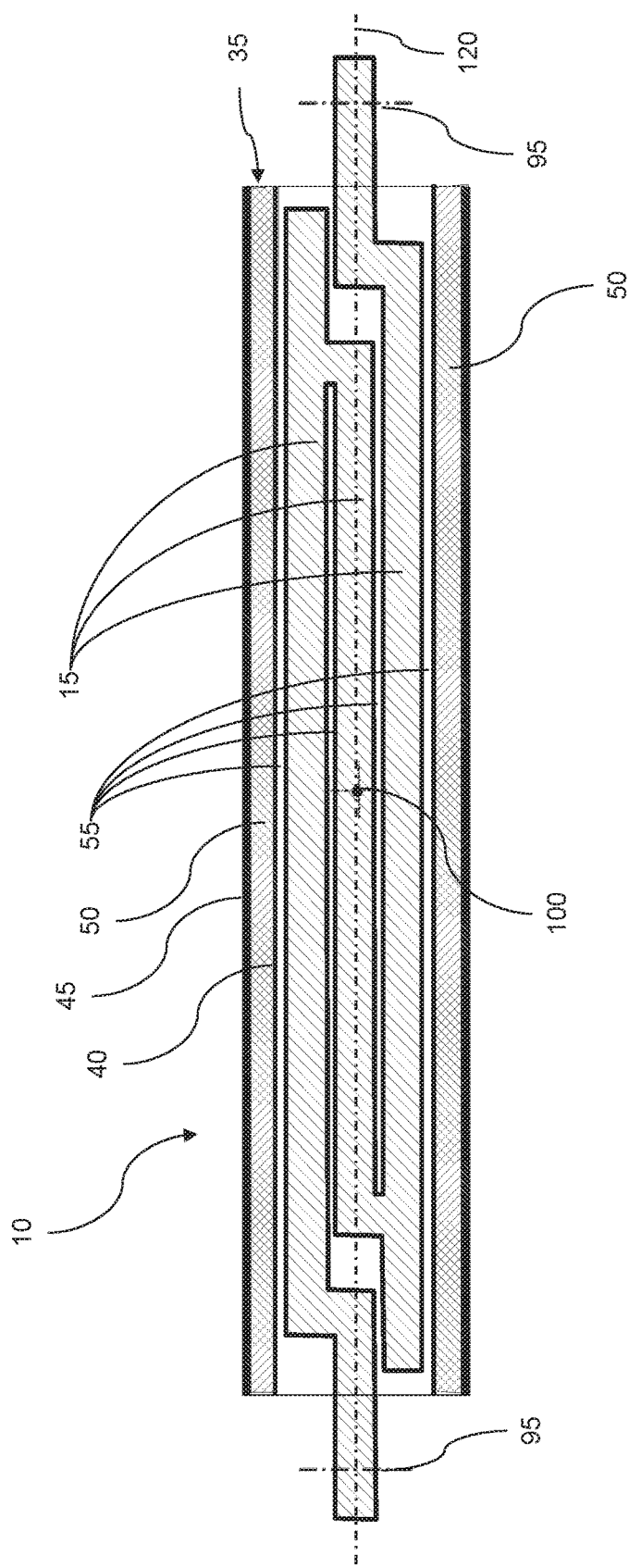
FIG. 2: a plan view of a second embodiment of an inventive energy dissipating device corresponding to that shown in FIG. 1a but having in addition a containment tube and extensions as guides.

In FIG. 2 a second embodiment of the energy dissipating device 10 is shown, which comprises a containment tube 35 as a buckling preventer. This containment tube 35 prevents the hysteretic elements 15 from being laterally deformed as previously shown in FIG. 1d. The containment tube actually consists of an inner containment tube 40 and an outer containment tube 45. The space between the inner containment tube 40 and the outer containment tube 45 is filled with a stabilizing material 50. Furthermore, un-bonding material 55 is applied to the hysteretic elements 15 in order to reduce the frictional forces developed during relative movements between two hysteretic elements 15 as well as the relative movement of the hysteretic elements 15 and the containment tube 35. Furthermore, one of the hysteretic elements 15 comprises a containment tube fixing point 100 which keeps the containment tube always in central position independently from the hysteretic elements deformations.

Figures 3, 4:
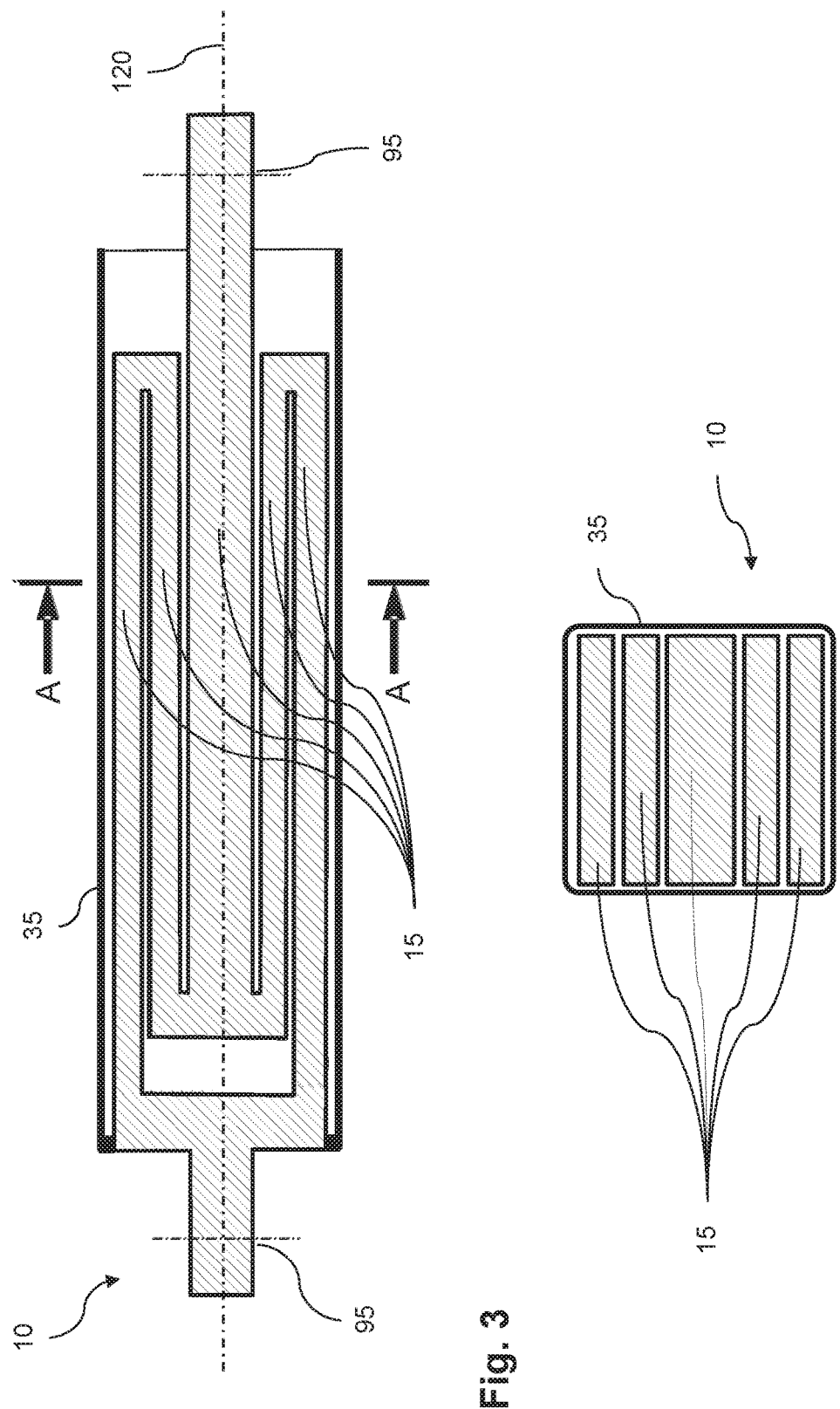
FIG. 3: a plan view of a third embodiment of an inventive energy dissipating device with a symmetric arrangement of the hysteretic elements and a containment tube.
FIG. 4: a cross-sectional view of the energy dissipating device shown in FIG. 3 along the section line A-A.

FIG. 3 illustrates a third embodiment of the energy dissipating device 10 in accordance with the invention. Here the energy dissipating device 10 is symmetric with respect to its longitudinal axis 120. The energy dissipating device 10 with its three hysteretic elements 15 is made out of one piece. As an alternative it is also possible that the hysteretic elements 15 as well as the end connections 95 are interconnected preferably by material fitting and thus form the energy dissipating device 10.

To prevent buckling the dissipating device 10 comprises a containment tube 35 as a buckling preventer. The containment tube 35 may be made of two tubes as shown in FIG. 2 and the space between the tubes may be filled with stabilizing material. An un-bonding material is placed on the surface of the hysteretic elements to reduce the frictional forces developed during the hysteretic elements' 15 movement relative to another hysteretic element 15 and to the containment tube 35. End connections 95 are provided on both sides of the device to mount the energy dissipating device 10 into a structure. These end connections 95 also allows a quick replacement of the energy dissipating device 10 whenever necessary.

FIG. 4 is a detailed cross sectional view taken along the section line A-A of the energy dissipating device 10 shown in FIG. 3. It is apparent that the hysteretic elements 15 are surrounded by the outer containment tube 35. It is also visible that the central hysteretic element of the five hysteretic elements 15 has a cross-sectional area that is approximately twice as large as the cross-sectional area of each of the four other hysteretic elements. This is due to the fact that the energy dissipating device 10 shown in FIG. 3 may in principle be obtained by coupling two energy dissipating devices 10 shown in FIG. 1a. By this configuration, the stress within the center hysteretic element of the five hysteretic elements 15 has preferably the same value as the stress in the four other hysteretic elements so as to achieve a uniform deformation of the hysteretic elements 15 under loading.

Figure 5:
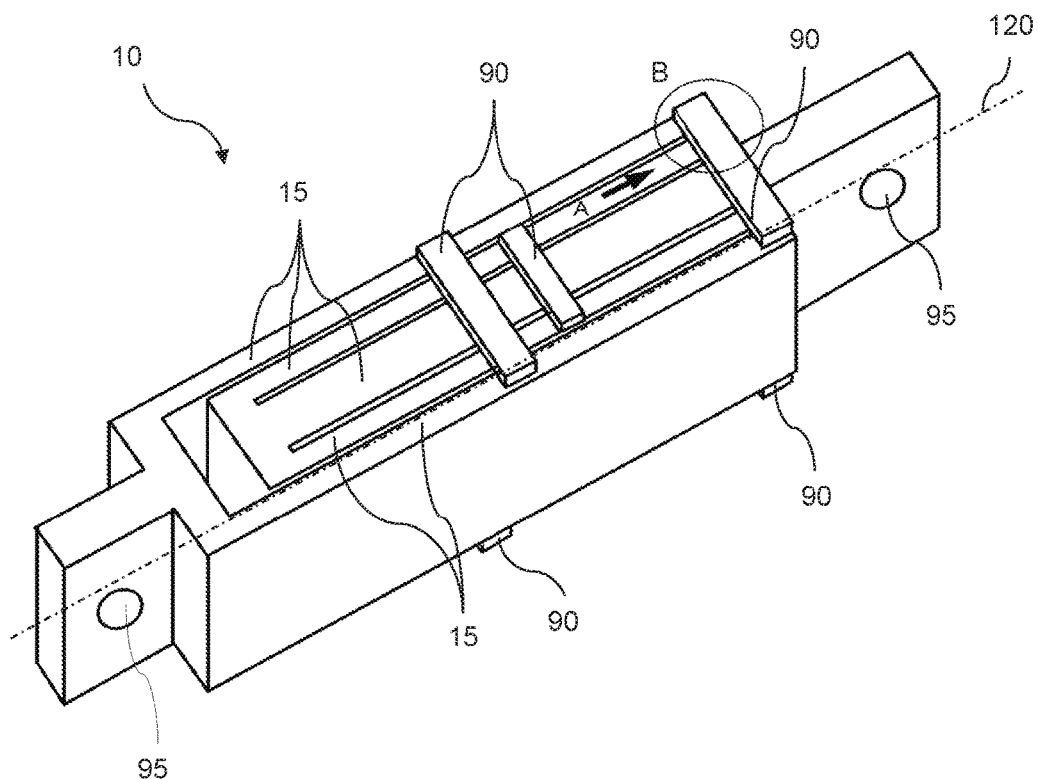
FIG. 5: an axonometric view of a fourth embodiment of the inventive energy dissipating device with a symmetric arrangement and a transverse restraint.

The energy dissipating device 10 shown in FIG. 5 is a fourth embodiment of the invention and a further development of the device shown in FIG. 3. All elements remain unaltered, but the containment tube 35, is replaced by two or more transverse restraints 90. These transverse restraints 90 connect at least the ends where the outer and middle hysteretic elements 15 are joined, so that the lateral deformations of the same hysteretic elements 15 ends are prevented. More transverse restraints 90 may be installed to connect also the intermediate parts of both outer and middle hysteretic elements 15 as shown in FIG. 5, thus increasing at will their resistance to buckling. The above justifies the reason why the containment tube 35 can be removed, without impairing the stability of the energy dissipating device. In this way the undesired frictional forces between the containment tube and the hysteretic yielding element are avoided.

Figure 6:
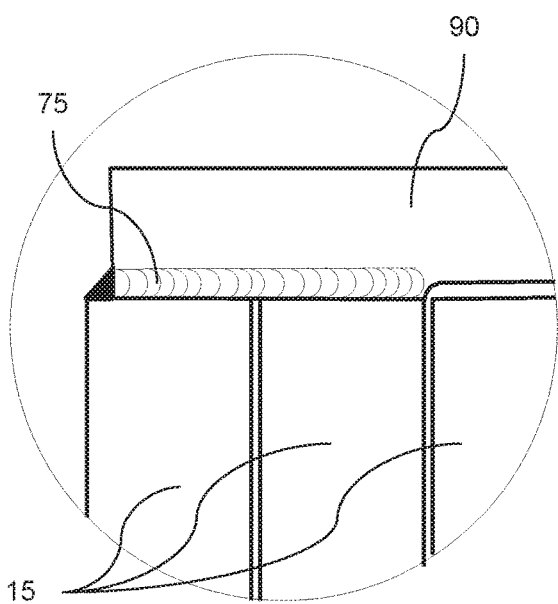
FIG. 6: an enlarged detailed view of section B shown in FIG. 5.

FIG. 6 is a detailed view of the connection between the outer end of the hysteretic elements 15 and the transverse restraints 90 as shown in FIG. 5. The connection is formed by a welded joint 75.

FIG. 7 shows a fifth embodiment of the energy dissipating device 10 of the invention wherein the three hysteretic elements 15 are three centrically arranged tubes 30. The tubes 30 are interconnected by steel crowns and steel plates 70. The innermost of the concentrically assembled tubes 30 is filled with a stabilizing material 50 in order to prevent a deformation of that innermost tube 30 and to increase the buckling resistance of that innermost tube 30 and consequently the whole energy dissipating device 10.

FIG. 8 is a cross sectional view of the energy dissipating device 10, shown in FIG. 7, taken across the section line A-A. FIG. 8a and FIG. 8b show two different shapes of tubes 30. FIG. 8a shows the concentrically assembled circular tubes 30 with the innermost tube 30 filled with stabilizing material 50. FIG. 8b shows an embodiment of the energy dissipating device 10 concentrically assembled square tubes 30, with the innermost of the tube 30 also filled with stabilizing material 50.

FIGS. 9a and 9b represent a detail of the outer and middle tube-like hysteretic elements of the fifth embodiment of FIG. 7, which for the purpose of this figure we consider interconnected at their upper end simply by a butt welding 125. In FIG. 9a the outer tube is subjected to a compressive force 115, while the middle tube (in this figure inner tube) is subjected to a tensile force 110. Under this loading condition the diameter of the circular upper end of the interconnected tubes will be reduced by the effect of the radial inwards bending moments consequent to the radially distributed local eccentricity. This effect is similar to that described in FIG. 1d.

FIG. 9b shows the effects of reversing the applied forces, namely tensile force 110 applied to the outer tube and compressive force 115 applied to the inner tube. Under this loading condition the diameter of the circular upper end of the interconnected tubes is increased by the effect of the radial outwards bending moments.

It has to be mentioned that all of the shown loading cases the scale of the radial deformations has been purposely enlarged for the benefit of the reader, nevertheless a radial outwards or inwards bending as described before is an undesired effect. It might lead to a contact between the concentrically arranged tube-like hysteretic elements 30 and causes undesired frictional forces.

All the above justifies the need for the adoption of rigid steel crowns and steel plates 70 to interconnect the tube-like hysteretic elements 30 in the fifth embodiment shown in FIG. 7, precisely to avoid the interference among the tube-like hysteretic elements 30 consequent to the radial deformations of their ends.

Figure 10:
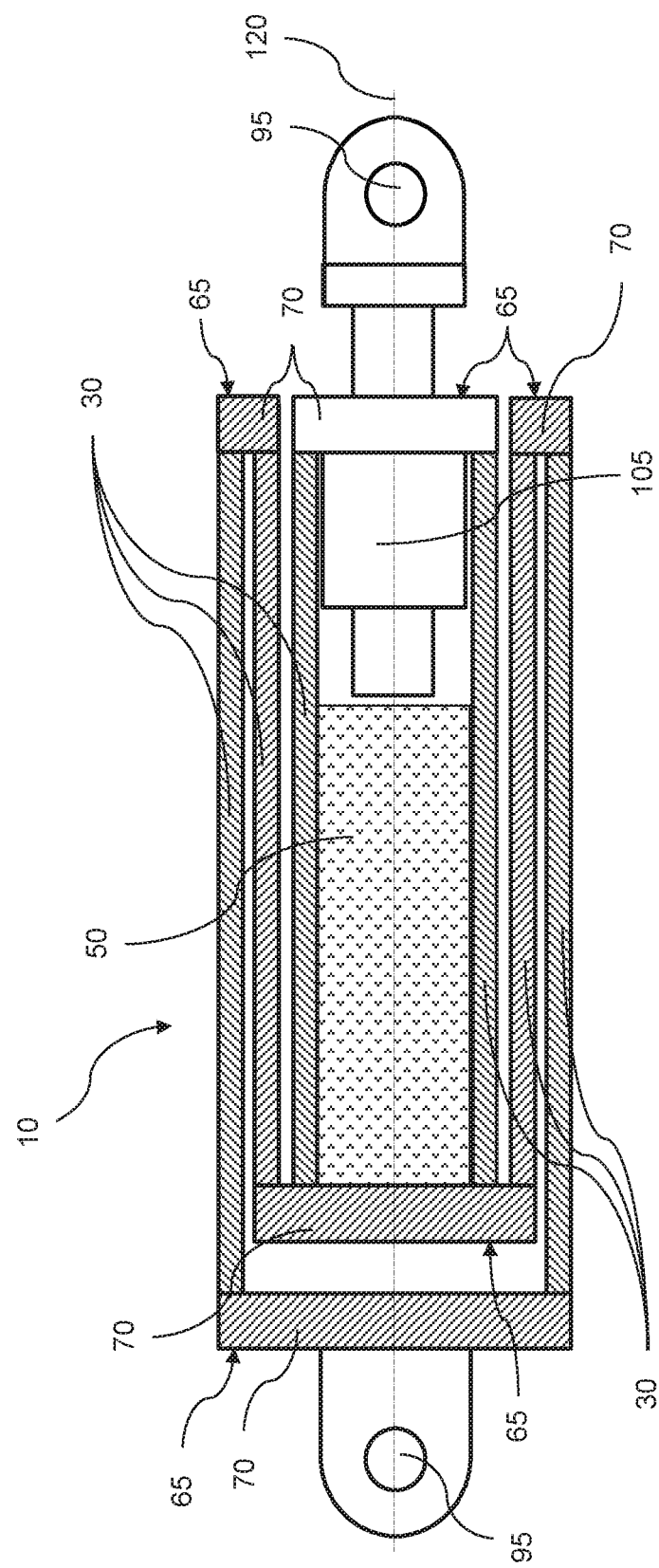
FIG. 10: a longitudinal-sectional view of a ninth embodiment of the energy dissipating device of the invention having a shock transmission unit.

In FIG. 10 a further embodiment of the invention's energy dissipating device 10 is shown which is almost identical to the device 10 shown in FIG. 7 except that the version of FIG. 10 additionally comprises rigid joints 65 and a shock transmission unit 105. These rigid joints 65 are formed by steel crowns and steel plates 70 which are thicker than the steel crowns and steel plates 70 shown in FIG. 7. This helps to reduce the undesired deformations shown in FIGS. 9a and 9b. Further, it enables a compact design since the clearance between the tube-like hysteretic elements 30 can be reduced.

The shock transmission unit 105 shown in FIG. 10 enables the energy dissipating device 10 to accommodate slow velocity movements of the structural elements which are connected without appreciable resistance and to transmit to the hysteretic elements the displacements due to an earthquake, so that a significant portion of energy associated to them can be dissipated.

Figure 11:
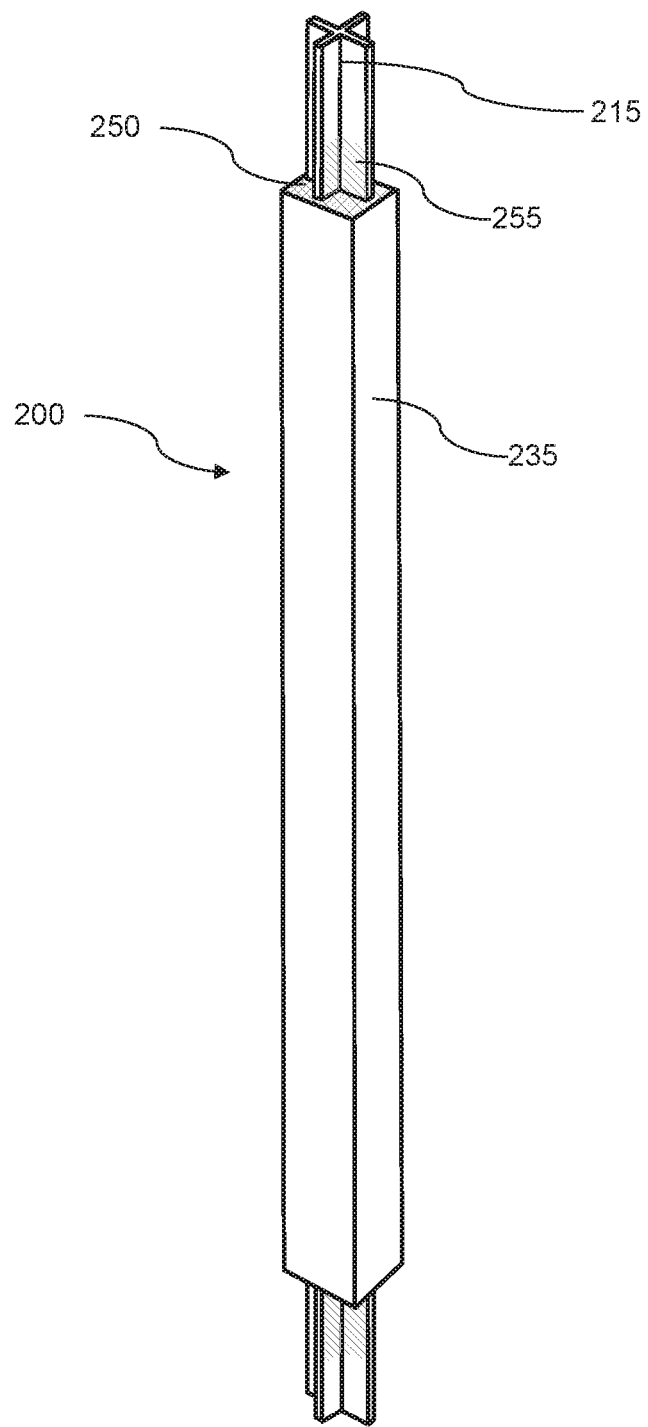
FIG. 11: an axonometric view of a buckling restraint brace known from the art.

FIG. 11 shows a buckling-restrained brace 200 known from the art. This buckling-restrained brace 200 comprises a liner yielding steel core 215 which is surrounded by a containment tube 235 as a buckling preventer. The space between the yielding steel core 215 and the containment tube 235 is filled with a stabilizing material 250. In order to avoid frictional forces when the linear hysteretic element is plastically deformed under an external force the yielding steel core 215 is coated with an un-bonding material 255. Since the buckling-restrained brace 200 comprises a single yielding steel core 215 said buckling-restrained brace 200 has a great overall length compared to its capability to accommodate displacements.

LIST OF REFERENCE SIGNS

10=Energy dissipating device
15=Hysteretic element or hysteretic element
20=Hysteretic element subjected to compression
25=Hysteretic element subjected to tension
30=Tube/tube-like element
35=Containment tube
40=Inner containment tube
45=Outer containment tube
50=Stabilizing material
55=Un-bonding material and/or a sliding pad
60=Extension
65=Rigid joint
70=Steel crown/steel plate
75=Welded joint
80=Bending moment
85=Distributed radially bending moment
90=Transverse restraint
95=End connection
100=Containment steel tube fixing point
105=Shock transmission unit
110=Tension force
115=Compression force
120=Longitudinal axis
125=Butt welding
200=Buckling-Restrained Braces (state of the art)
215=Yielding steel core
235=Containment tube
250=Stabilizing material
255=Un-bonding material
a=Bedstop distance
e=Eccentricity

The invention claimed is:

1. An energy dissipating device capable of dissipating energy through its plastic axial deformation without undergoing buckling, wherein,
    the energy dissipating device comprises at least three hysteretic elements, being interconnected in series in such a way, that at least one hysteretic element will be subjected to compression while at least another hysteretic element is subjected to tension under an external load being applied to the energy dissipating device,
    wherein the hysteretic elements are arranged alongside to each other, or at least one hysteretic element is arranged concentrically with another hysteretic element.

2. An energy dissipating device according to claim 1, wherein, the energy dissipating device comprises a buckling preventer.

3. An energy dissipating device according to claim 2, wherein, the innermost of at least one hysteretic element is filled with a stabilizing material as buckling preventer.

4. An energy dissipating device according to claim 2, wherein, the buckling preventer comprises a containment tube surrounding at least one hysteretic element wherein the space between the hysteretic element and the containment tube may be filled with a stabilizing material at least partially.

5. An energy dissipating device according to claim 2, wherein, the buckling preventer comprises at least one transverse restraint interconnecting at least two hysteretic elements.

6. An energy dissipating device according to claim 1, wherein, the concentrically arranged hysteretic elements are formed of tubes.

7. An energy dissipating device according to claim 6, wherein, the median part of one or more tubes has at least one cut longitudinally.

8. An energy dissipating device according to claim 1 wherein, the hysteretic elements are arranged in parallel to each other.

9. An energy dissipating device according to claim 1, wherein, at least one hysteretic element is made of a metal or an alloy.

10. An energy dissipating device according to claim 1, wherein, at least one hysteretic element comprises on at least one of its surfaces a lubricant and/or an un-bonding material or a sliding pad in order to reduce frictional forces developed during a relative movement between the at least one hysteretic element and the stabilizing material and/or the containment tube and/or another hysteretic element under an external load.

11. An energy dissipating device according to claim 1, wherein, said device comprises a rigid joint which connects at least two hysteretic elements in series, being preferably formed by at least a steel crown or steel plate interconnecting the two hysteretic elements.

12. An energy dissipating device according to claim 1, wherein, the energy dissipating device comprises a shock-transmitter that accommodates slow velocity movements and transmits almost unaltered sudden onset movements.

* * * * *